US006745566B2

(12) United States Patent
Freelain

(10) Patent No.: US 6,745,566 B2
(45) Date of Patent: Jun. 8, 2004

(54) HYDROELECTRIC POWER CYCLE HAVING BUOYANT RACK

(75) Inventor: Kenneth W. Freelain, 6821 Red Top Rd., Apt. T2, Takoma Park, MD (US) 20912-5982

(73) Assignee: Kenneth W. Freelain, Takoma Park, MD (US)

( * ) Notice: Subject to any disclaimer, the term of this patent is extended or adjusted under 35 U.S.C. 154(b) by 0 days.

(21) Appl. No.: 10/025,689

(22) Filed: Dec. 26, 2001

(65) Prior Publication Data

US 2003/0115868 A1 Jun. 26, 2003

(51) Int. Cl.[7] ................................................ F03C 5/02
(52) U.S. Cl. ........................................................ 60/507
(58) Field of Search ........................... 60/495, 496, 497, 60/507

(56) References Cited

U.S. PATENT DOCUMENTS

| 3,959,663 A | * | 5/1976 | Rusby | 290/53 |
| 3,961,479 A | * | 6/1976 | Anderson | 60/496 |
| 4,111,610 A | * | 9/1978 | Brown | 417/332 |
| 4,249,639 A | * | 2/1981 | Vukovic | 185/30 |

* cited by examiner

Primary Examiner—Hoang Nguyen

(57) ABSTRACT

The rack is connected to a frame which is secured to the bottom of an ocean or lake with high waves which move up and down with high frequency. Pawls enable the up and down motion of the buoyant rack to turn the driving shaft of a pump. This invention combines the rack and pinion concept with the pawl and ratchet concept, thereby converting the up-and-down motion of the reciprocating rack into the rotation of the shaft which drives the pump. Water is pumped up, by the pumps, to generate hydroelectric power.

1 Claim, 3 Drawing Sheets

HYDROELECTRIC POWER CYCLE HAVING BUOYANT RACK

BACKGROUND OF THE INVENTION

As mankind becomes more dependent upon electric power, more ways of producing electricity need to be developed. Coal, oil and natural gas are depletable fossil fuels which produce air pollution. In addition, these limited fossil fuels only exist in finite quantities. Nuclear power plants are associated with tremendous waste disposal problems.

This invention enables us to utilize the energy of the waves which exist atop the surfaces of oceans and large lakes. Those waves can raise buoyant racks, thereby driving pumps which can lift water for generating hydroelectric power.

Accordingly there is a need in the art for a system which would allow mankind to harness the energy from the waves on the surfaces of oceans and lakes in order to produce clean and non-polluting electric power in large quantitites.

SUMMARY OF THE INVENTION

This invention relates to a buoyant rack to which pawls are attached, or to a rack with standard teeth while the pawls are connected to the ratchet gear which drives the pump.

As one preferred arrangement, a water pumping system used in this invention may be of the type described in U.S. patent application Ser. No. 081267,028 filed Jun. 21, 1994 by Kenneth Freelain. This U.S. patent application is entirely incorporated herein for reference. Other suitable water pumping systems, electricity generating systems and the like may be utilized without departing from the invention.

DETAILED DESCRIPTION OF THE INVENTION

This invention describes a mechanism which converts the vertical motion, up and down, of a rack into the rotation of a shaft. The rack is buoyant, so as waves rise and fall in FIG. 1 and FIG. 2, the rack rises and falls.

Figure 3:
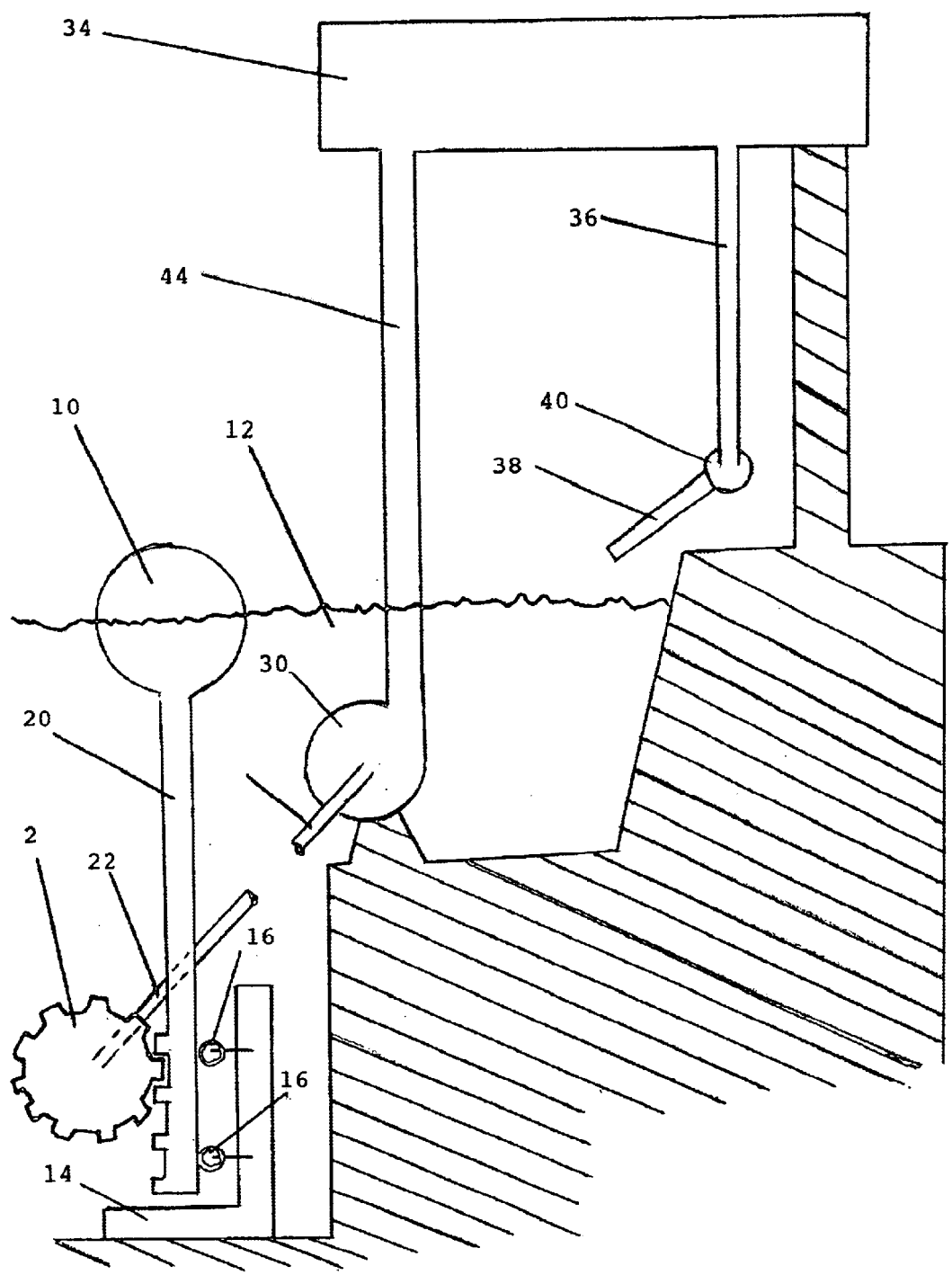
FIG. 3 gives us a side view of the hydroelectric power generation system.

FIG. 3 provides a schematic overview of the hydroelectric power system into which the shaft pumps water. In order to increase and smooth out the power which is delivered to any particular gear and shaft, it is obvious that the number of racks in contact with any one gear and shaft can be increased.

Figure 1:
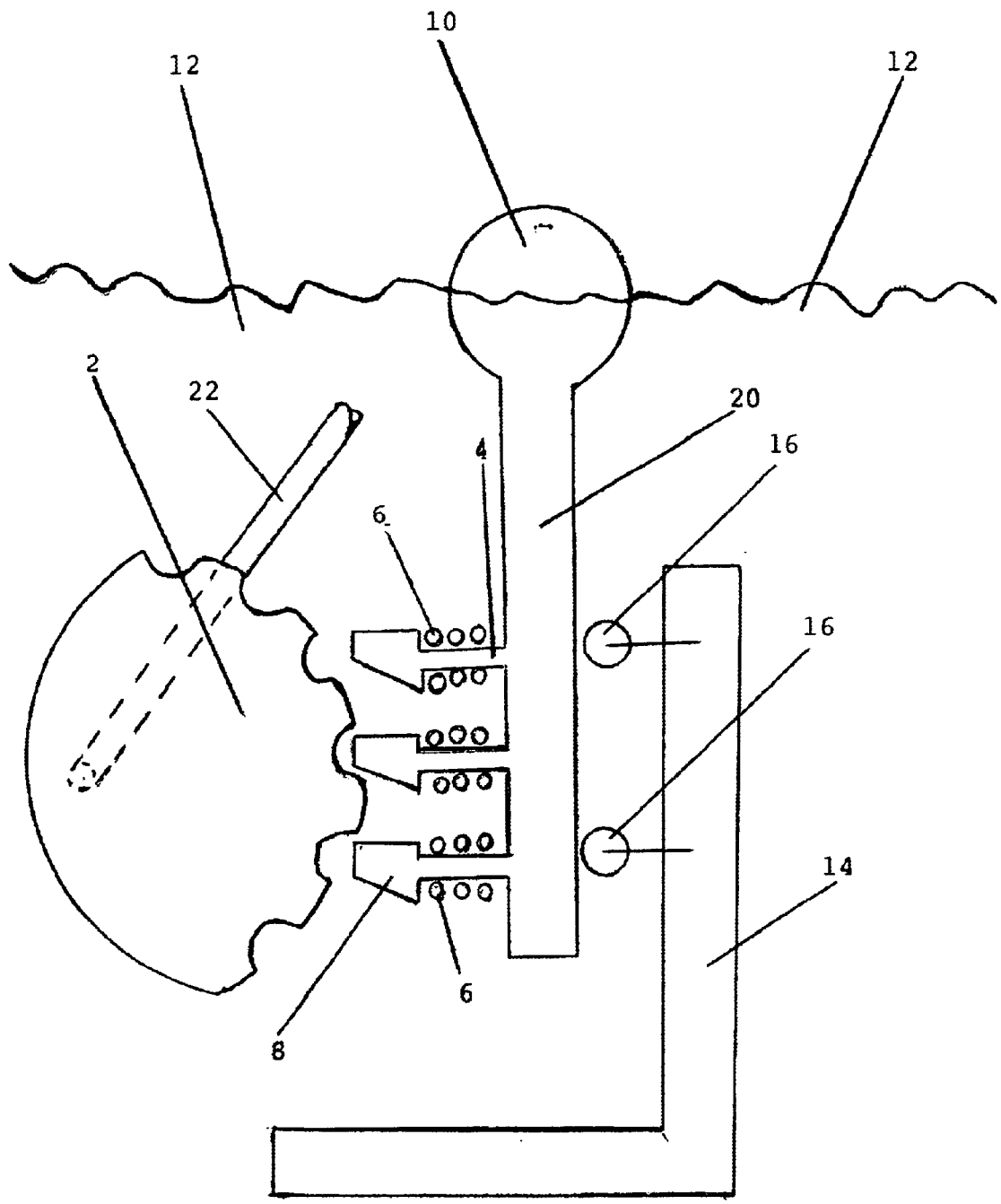
FIG. 1 is a side view of the buoyant rack and pawls driving the shaft to pump water.
Figure 2:
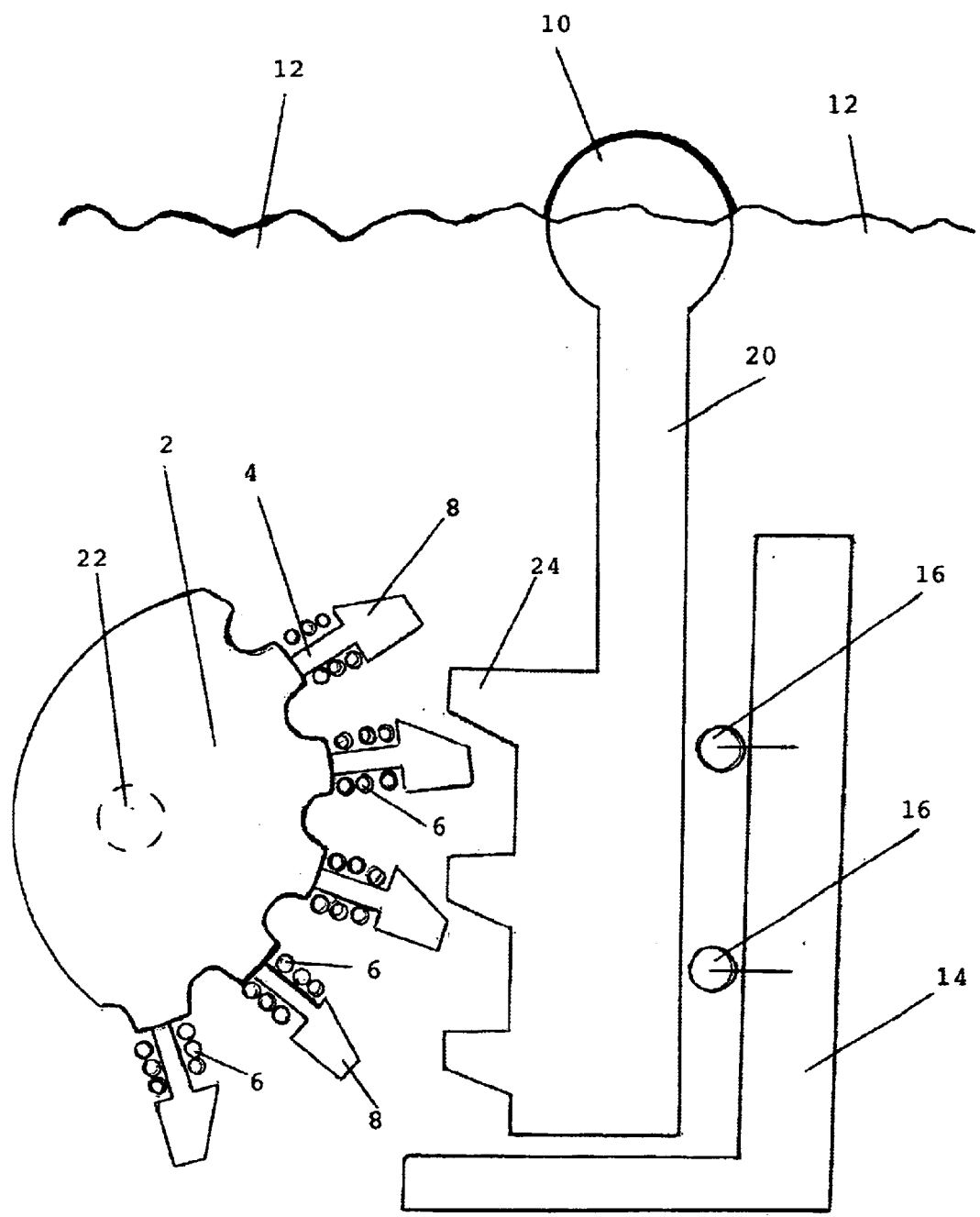
FIG. 2 is a side view of an alternative configuration where the pawls are mounted directly onto the shaft and rotating with the shaft instead of reciprocating with the rack as in FIG. 1.

In FIG. 1, the waves 12 on the surface of the ocean or lake rise and fall, causing the buoyant bulb 10 attached to the top of the rack 20 to rise and fall. The bulb 10 is an integral component of the rack 20. Wheels 16 enable the rack 20 to roll when it is in direct contact with the surface of the frame 14. A shaft 22 is attached to the gear 2 so that when the rack 20 moves upward, it rolls along the wheels 16, and the pawls 4, engage the teeth on the gear, causing the gear 2 to rotate counter-clockwise. When the rack 20 moves downward, the springs 6 on the pawl 4 allow the pawl's head 8 to compress the pawl's spring 6, so the pawl 4 slides over the teeth 2 without becoming engaged with the teeth 2 on the gear 2. In FIG. 2, the pawl 4 is directly attached to the gear 2 wheras the rack only consists of regular gear teeth without pawls. When the rack 20 moves upward, the pawl 4 becomes engaged, causing the gear to rotate in a counter-clockwise direction. However, when the wave subsides and the rack 20 moves down, the spring 6 in the pawl 4 becomes compressed, allowing the head 8 of the pawl to slide right over the tooth of the rack 20 without becoming engaged with the gear tooth 24 on the rack 20. Therefore, in both FIG. 1 and FIG. 2, the upward motion of the rack 20 tends to cause the gear 2 to revolve in a counter-clockwise direction, and when the rack necessarily moves down at some point in time, the head 8 of the pawl compresses the spring 6 and reduces the overall length of the body of the pawl 4. Therefore, the pawl slides over the tooth 24 or 2, depending upon whether the tooth is on the gear 2 or on the rack 24. In either case, on the the trip downward, the pawl head 8 fails to engage with the gear wheel 2 or with the gear on the rack 24, so that only the rising waves can cause the gear shaft 2 to rotate in a counter clock-wise direction.

In FIG. 3, the bulb 10 sits on top of the rack 20, driving the gear 2 which turns the shaft 32 into the pump 30. The pump 30 raises water by utilizing the water-lifting piping 44 into the reservoir 34 or water storage tank 34.

Then, the water can drop down through the penstock 36 on its way to the hydroturbine-generator unit 40. The water is returned into the original

I claim:

1. A hydroelectric power cycle comprising a buoyant rack, a gear having holes in which pawls are mounted, to rotate with the gear, and a system in which said pawls can be mounted upon holes of the buoyant rack thereby moving up and down, in a vertical direction moving exactly when and where the rack moves.

* * * * *